No. 761,847. PATENTED JUNE 7, 1904.
J. MILLAR.
TIRE.
APPLICATION FILED MAR. 7, 1904.
NO MODEL.
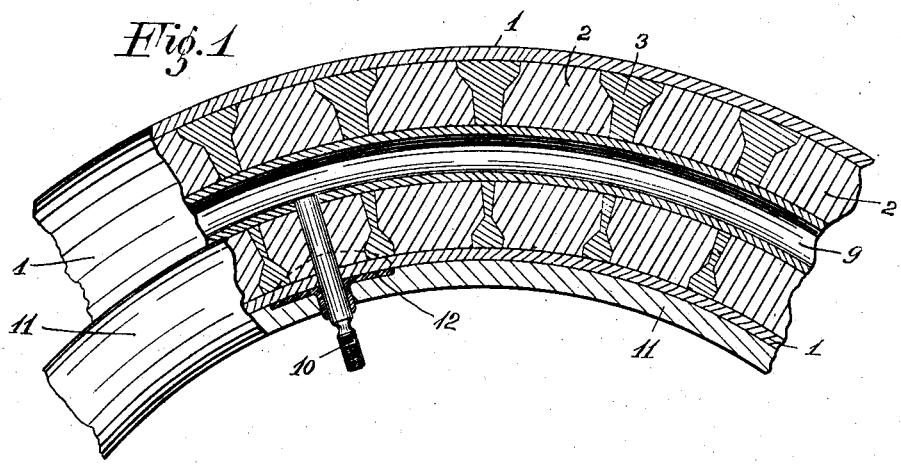
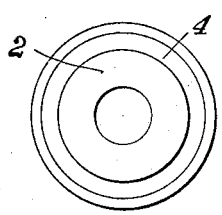 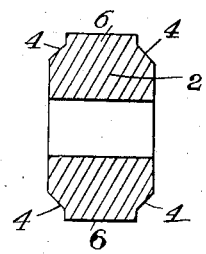 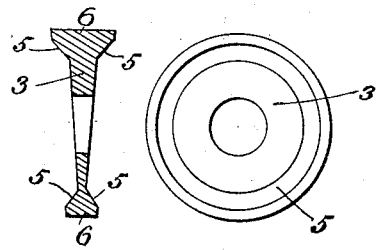
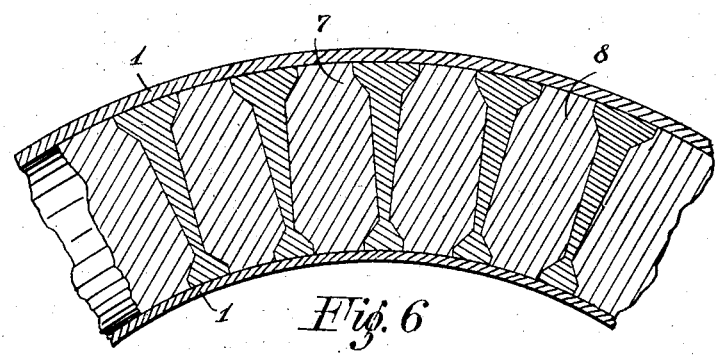
Witnesses
Ivan Ronigsberg.
Annie Wissmann
John Millar,
Inventor
By his Attorneys
Backer & Spaulding No. 761,847. Patented June 7, 1904.

UNITED STATES PATENT OFFICE.

JOHN MILLAR, OF KEARNEY, NEW JERSEY, ASSIGNOR OF ONE-HALF TO HENRY WILLOUGHBY, JR., OF KEARNEY, NEW JERSEY.

TIRE.

SPECIFICATION forming part of Letters Patent No. 761,847, dated June 7, 1904.

Application filed March 7, 1904. Serial No. 197,015. (No model.)

*To all whom it may concern:*

Be it known that I, JOHN MILLAR, a subject of the King of Great Britain and Ireland, and a resident of Kearney, Hudson county, New Jersey, have invented certain new and useful Improvements in Tires, of which the following is a specification.

My invention relates to tires for vehicles, cycles, or the like; and its object is the production of a light, resilient, and punctureless tire or, at least, a tire that will not be affected by being punctured. In carrying out this object I employ a suitable and circular-shaped casing and a core composed of segmental members placed circumferentially within the casing. These members can be either in the form of disks or rings and may be made of any suitable material; but preferably I use cork and rubber members alternating with each other. To cause these members to conform to the arc of the circle of the casing, alternating members are made with a taper toward the center.

In the accompanying drawings I have shown my invention embodied in two forms, but do not wish to confine myself to the exact structure shown, as changes of forms and structure may be made without departing from the spirit of my invention.

In the said drawings, Figure 1 is a sectional view of part of a tire embodying my invention. Figs. 2, 3, 4, and 5 are detail views of the members composing the core of the tire. Fig. 6 shows a modification.

Similar characters of reference indicate corresponding parts in the different views.

1 denotes a circular-shaped casing of any suitable character, but preferably in the form of an ordinary pneumatic tire. Within this casing are placed a plurality of segmental members, preferably two series, as 2 and 3, alternating with each other and forming a core. These members can be made of any suitable material, as cork; but preferably the members 2 are of cork and the members 3 of rubber. The said members 2 and 3 are provided with circumferential beveled shoulders 4 and 5 in apposition to each other and adjacent to the circular casing, so as to fit snugly together and guide each other when inserted into the casing. One series of the said members, in the present instance the members 3, taper toward the center of the wheel in order to conform to the arc of the circle of the tire. As will be noticed, the surface 6 of the said members is straight with relation to the circumference of the tire or casing, thereby gripping the casing.

In the construction shown in Figs. 1, 2, 3, 4, and 5 the members 2 and 3 are in the form of rings, while in Fig. 6 the members are solid disks, as indicated by 7 and 8. When the rings are used, I may employ an inner tube 9 and also, if desired, a valve 10, through which air can be introduced into the tire. In this instance the valve 10 is shown as passing through the rim 11 of the wheel. The segmental members are introduced into the casing 1 through a suitable opening, which is afterward closed up by some suitable means, as the flap 12.

What I claim is—

1. A tire composed of a circular casing and a plurality of segmental members having beveled shoulders in apposition to each other located inside of the said casing.

2. A tire composed of a circular casing and two series of segmental members of cork and rubber alternating with each other and having beveled shoulders in apposition to each other, located inside of the said casing.

3. A tire composed of a circular casing and two series of segmental members alternating with each other and having beveled shoulders in apposition to each other, located inside of the said casing, one of said series tapering toward the center of the wheel.

4. A tire composed of a circular casing and a plurality of segmental rings having beveled shoulders in apposition to each other located inside of the said casing.

5. A tire composed of a circular casing and two series of rings of cork and rubber alternating with each other and having beveled shoulders in apposition to each other located inside of the said casing.

6. A tire composed of a circular casing and two series of segmental alternating rings with each other and having beveled shoulders in apposition to each other, located inside of the said casing, one of said series of rings tapering toward the center of the wheel.

7. A tire composed of a circular casing and a plurality of segmental members having beveled shoulders in apposition to each other and adjacent to the circular casing, located inside of the said casing.

8. A tire composed of a circular casing and two series of segmental members of cork and rubber alternating with each other and having beveled shoulders in apposition to each other and adjacent to the circular casing, located inside of the said casing.

9. A tire composed of a circulating casing, and two series of segmental members alternating with each other and having beveled shoulders in apposition to each other, and adjacent to the circular casing, located inside of the said casing, one of said series tapering toward the center of the wheel.

10. A tire composed of a circular casing and a plurality of segmental rings having beveled shoulders in apposition to each other and adjacent to the circular casing, located inside of the said casing.

11. A tire composed of a circular casing and two series of rings of cork and rubber alternating with each other and having beveled shoulders in apposition to each other and adjacent to the circular casing, located inside of the said casing.

12. A tire composed of a circular casing and two series of segmental rings alternating with each other, and having beveled shoulders in apposition to each other, and adjacent to the circular casing, located inside of the said casing, one of said series of rings tapering toward the center of the wheel.

Signed at Kearney, New Jersey, this 2d day of March, 1904.

JOHN MILLAR.

Witnesses:
  HARRY WILSON,
  CHARLES C. RIECK.